US009834077B2

(12) United States Patent
Konishi et al.

(10) Patent No.: US 9,834,077 B2
(45) Date of Patent: Dec. 5, 2017

(54) DEFLECTOR DEVICE FOR VEHICLE

(71) Applicant: AISIN SEIKI KABUSHIKI KAISHA, Kariya-shi, Aichi-ken (JP)

(72) Inventors: Katsumi Konishi, Toyota (JP); Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/320,480

(22) PCT Filed: Jun. 17, 2015

(86) PCT No.: PCT/JP2015/067462
§ 371 (c)(1),
(2) Date: Dec. 20, 2016

(87) PCT Pub. No.: WO2015/198841
PCT Pub. Date: Dec. 30, 2015

(65) Prior Publication Data
US 2017/0158038 A1    Jun. 8, 2017

(30) Foreign Application Priority Data
Jun. 27, 2014  (JP) ................................. 2014-133200

(51) Int. Cl.
*B60J 7/22*    (2006.01)
*B60J 7/043*   (2006.01)
*B60J 7/047*   (2006.01)

(52) U.S. Cl.
CPC .................. *B60J 7/22* (2013.01); *B60J 7/043* (2013.01); *B60J 7/047* (2013.01)

(58) Field of Classification Search
CPC ........................................................ B60J 7/22

USPC .......................................................... 296/217
See application file for complete search history.

(56) References Cited

U.S. PATENT DOCUMENTS 6,966,603 B2 * 11/2005 Grimm ..................... B60J 7/22
296/217
2003/0038512 A1    2/2003 Farber et al.

FOREIGN PATENT DOCUMENTS

DE    10 2011 116 109 A1    4/2013

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A deflector apparatus for a vehicle includes a lower frame fixed to a roof of a vehicle and a fitting recess. A facing is held by the lower frame and an upper frame, the facing protrudes above a surface of the roof in association with an upward movement of the upper frame, the facing is folded and retracted towards a rear side in association with a downward movement of the upper frame. A guide member includes a fitting protrusion fitted in the fitting recess and elastically recovering to guide the facing to be folded at a retracting movement of the facing. A restriction wall restricts the guide member from moving such that a movable distance of the guide member in a counter-insertion direction of the fitting protrusion is a distance that is shorter than an insertion amount of the fitting protrusion relative to the fitting recess.

4 Claims, 4 Drawing Sheets

DEFLECTOR DEVICE FOR VEHICLE

CROSS-REFERENCE TO RELATED APPLICATIONS

This application is a national phase application of International Application No. PCT/JP2015/067462, filed Jun. 17, 2015, and claims the priority of Japanese Application No. 2014-133200, filed Jun. 27, 2014, the content of both of which is incorporated herein by reference.

TECHNICAL FIELD

The present invention relates to a deflector apparatus for a vehicle.

BACKGROUND ART

As illustrated in FIG. 6, a known deflector apparatus for a vehicle, which is described in Patent document 1, includes an upper frame 91, a lower frame 92 and a facing 93, which are extended in a vehicle width direction along a front edge portion of an opening formed at a roof 90 of a vehicle. Both end portions, in a short-side direction, of the facing 93 are held by the upper frame 91 and the lower frame 92, respectively. As the upper frame 91 moves upwardly relative to the lower frame 92, the facing 93 together with the upper frame 91 protrudes above a surface of the roof 90, and thus the facing 93 is expanded. As the upper frame 91 moves downwardly relative to the lower frame 92, the facing 93 together with the upper frame 91 comes to be retracted at a lower side relative to the surface of the roof 90.

A flexible guide member 95 is attached to the lower frame 92. The guide member 95 is elastically deformed by the facing 93 in association with an expanding movement of the facing 93, while the guide member 95 elastically recovers in association with a retracting movement of the facing 93 and guides the facing 93 to be folded towards a rear side of the vehicle. The guide member 95 is elastically deformable due to a tensile force of the facing 93, and accordingly the guide member 95 does not inhibit the facing 93 from performing the expanding movement.

DOCUMENT OF PRIOR ART

Patent Document

Patent document 1: Description of German patent application publication No. DE 10 2011 116 109 A1

SUMMARY OF INVENTION

Problem to be Solved by Invention

At the deflector apparatus for the vehicle of Patent document 1, the guide member 95 is fixed to the lower frame 92 in a manner that an attachment pin 97 protrudingly provided at the guide member 95 is inserted from above in a vehicle height direction into an attachment hole 96 formed at the lower frame 92. In this case, because an upper side of the lower frame 92 is open, the attachment pin 97 may come off the attachment hole 96 and accordingly the guide member 95 may possibly come off the flower frame 92. A distal end portion of the attachment pin 97 includes a protrusion for a come-off prevention, however, the possibility remains that the guide member 95 comes off the lower frame 92.

A purpose of the present invention is to provide a deflector apparatus for a vehicle, which can restrict a guide member from coming off.

Means for Solving Problem

A deflector apparatus for a vehicle which solves the above-described problem includes a lower frame fixed to a roof of a vehicle to be extended in a vehicle width direction along a front edge portion of an opening formed at the roof, the lower frame including a fitting recess, an upper frame extended in the vehicle width direction along the front edge portion of an opening, a facing extended along the front edge portion of the opening and including both end portions in a short-side direction, both the end portions being held by the lower frame and the upper frame, respectively, the facing being configured to protrude above a surface of the roof in association with an upward movement of the upper frame relative to the lower frame, the facing being configured to be folded and retracted towards a rear side of the vehicle in association with a downward movement of the upper frame relative to the lower frame, a guide member including a fitting protrusion fitted in the fitting recess along an insertion direction, the guide member elastically recovering to guide the facing to be folded towards the rear side of the vehicle at a retracting movement of the facing, and a restriction wall restricting the guide member from moving in a counter-insertion direction of the fitting protrusion such that a movable distance of the guide member in the counter-insertion direction is a distance that is shorter than an insertion amount of the fitting protrusion relative to the fitting recess.

MODE FOR CARRYING OUT THE INVENTION

An embodiment of a deflector apparatus for a vehicle will be described below. In the following description, terms "front", "rear", "upper", "lower" "width" are defined by using a vehicle as a standard.

Figure 1:
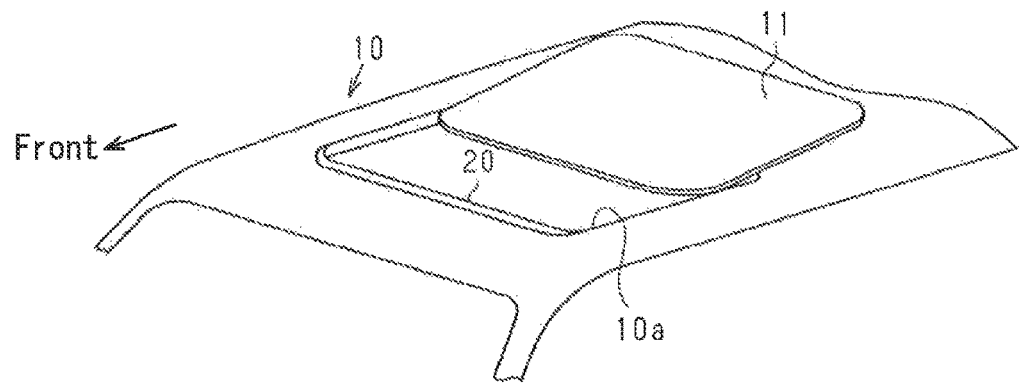
FIG. 1 is a perspective view of a roof seen from obliquely upward.

As illustrated in FIG. 1, a roof 10 of a vehicle, including an automobile, includes an opening 10a including a substantially quadrilateral shape. The roof 10 supports a deflector 20 extended in a width direction along a front edge portion of the opening 10a, and a movable panel 11 which can open and close the opening 10a, and is formed of, for example, glass plate and is formed in a substantially quadrilateral shape.

The deflector 20 is connected to the roof 10 at both end portions, in the width direction, of the deflector 20. The deflector 20 is rotatable about an axis line extended in the width direction. A front portion of the deflector 20 moves upwardly due to a rotational movement about a rear end portion of the deflector 20. That is, the deflector is attached to the roof 10 to be able to perform a tilt-up movement. In association with an opening movement of the movable panel 11, the deflector 20 is released from the movable panel 11 and performs the tilt-up movement to protrude towards an upper side relative to an upper surface of the roof 10 (an expanded state). In association with a closing movement of the movable panel 11, the deflector 20 is pushed and held down by the movable panel 11, and is retracted at a lower side relative to the upper surface of the roof 10 (a retracted state). The deflector 20 is brought into the expanded state when the opening 10a is open, and accordingly the deflector 20 prevents air vibration from occurring due to entrainment of air into a vehicle cabin.

The movable panel 11 is capable of performing a tilt-up movement in which a rear portion of the movable panel 11 moves upwardly while the movable panel 11 is rotating about a front portion of the movable panel 11 with the front portion serving as a center, and performing a slide movement in a front and rear direction. At the opening and closing movement of the opening 10a, the movable panel 11 performs the slide movement while being maintained in a tilt-up state. That is, the movable panel 11 is an outer-sliding type panel.

Figure 2:
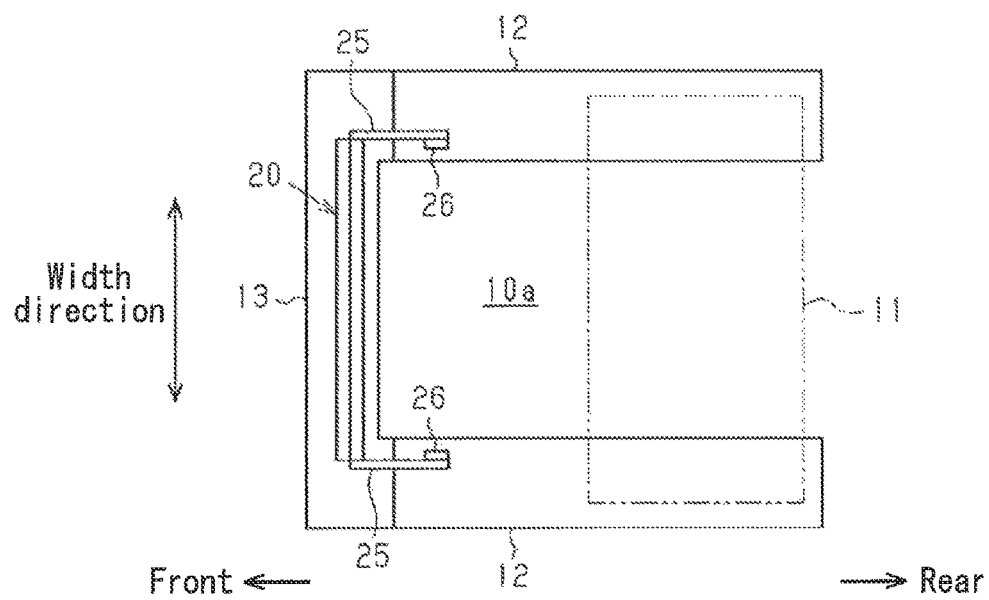
FIG. 2 is a plane view schematically illustrating an embodiment of a deflector apparatus of the present invention, which is to be attached to the roof of FIG. 1.
Figure 3:
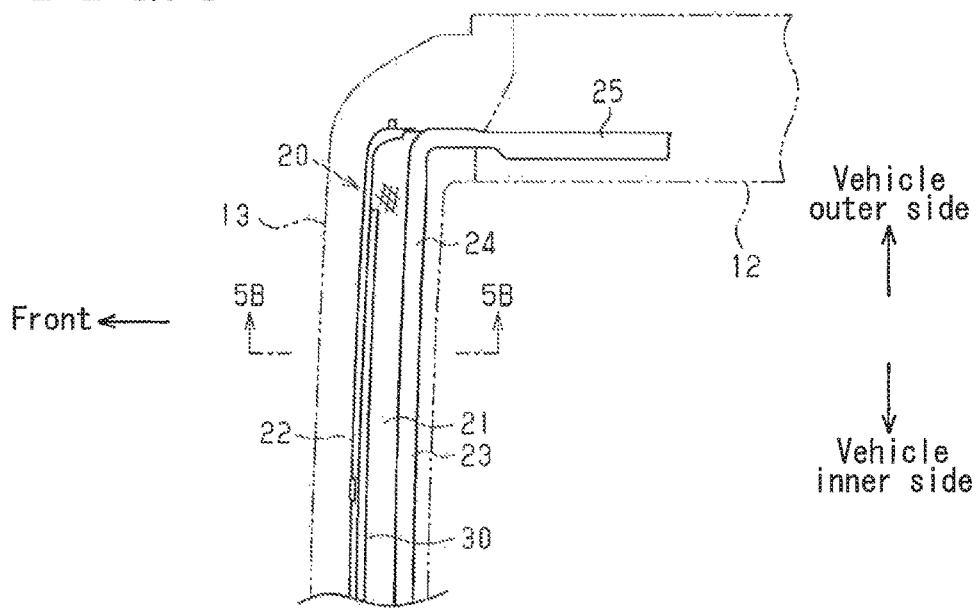
FIG. 3 is a plane view illustrating, in an enlarged manner, part of the deflector apparatus of FIG. 2.

As illustrated in FIGS. 2 and 3, guide rails 12 are fixedly arranged as a pair at respective edge portions, in the vehicle width direction, of the opening 10a. The pair of guide rails 12 is made of extruded material of aluminum alloy, for example. An appropriate drive mechanism (not shown), which is for driving the movable panel 11, slides relative to the guide rails 12. Both the end portions of the deflector 20 in the vehicle width direction are rotatably connected to front end portions of the respective guide rails 12. The front end portions of the guide rails 12 are connected to each other via a front housing 13 extended in the vehicle width direction and made of, for example, resin material.

Figure 4:
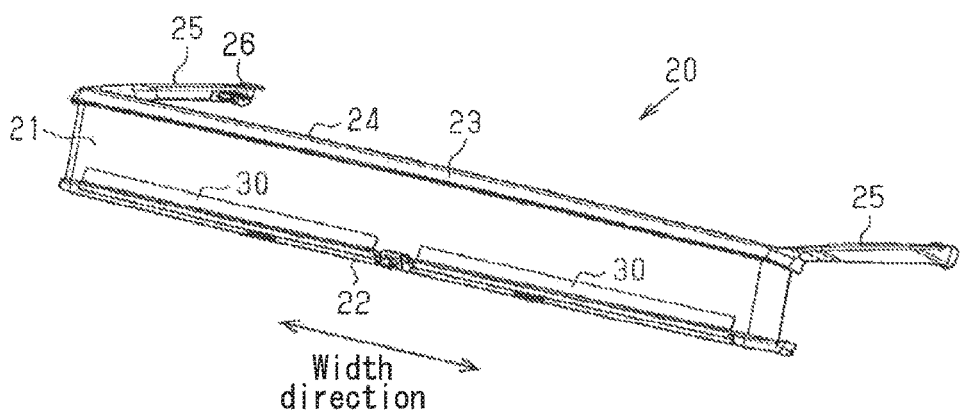
FIG. 4 is a perspective view of the deflector apparatus of FIG. 2.

Next, the deflector 20 and a support structure thereof will be further described. As illustrated in FIGS. 3 and 4, the deflector 20 includes a mesh member (a facing) 21 formed in a substantially band-shape and made of resin material, for example. The mesh member 21 is provided to extend in the width direction along the front edge portion of the opening 10a positioned at a front side relative to the guide rails 12. The deflector 20 includes a lower frame 22 formed in a substantially rod-shape and made of resin, for example. The lower frame 22 is extended in the vehicle width direction along the front housing 13 and is held at the front housing 13. An end portion of the mesh member 21 at one side in a short-side direction (the lower side in FIG. 4) is arranged at the lower frame 22 in a buried manner throughout the entire length of the mesh member 21 in a long-side direction of the mesh member 21.

Further, the deflector 20 includes an upper frame 23 made of resin material, for example. The upper frame 23 integrally includes a frame portion 24 formed in a substantially rod shape and two arm portions 25. The frame portion 24 is extended in the width direction along the front edge portion of the opening 10a, and the arm portions 25 are provided to extend from respective end portions, in the width direction, of the frame portion 24 towards a rear side. An end portion of the mesh member 21 at one side in the short-side direction (the upper side in FIG. 4) is arranged at the frame portion 24 of the upper frame 23 in a buried manner throughout the entire length of the mesh member 21 in the long-side direction of the mesh member 21. A shaft portion 26, which includes a central axis line extending in the width direction and is formed in a substantially circular cylindrical shape, is provided at a rear end portion of each arm portion 25 to protrude towards a vehicle inner side. The arm portions 25 (the deflector 20) are rotatably connected to the guide rails 12 at the shaft portions 26, respectively. The arm portion 25 is always biased by an appropriate biasing member (not shown) including, for example, a bending spring and/or a torsion spring, so that a front end of the arm portion 25 moves upwardly relative to the shaft portion 26, that is, so that the deflector 20 performs the tilt-up movement.

Figure 5A:
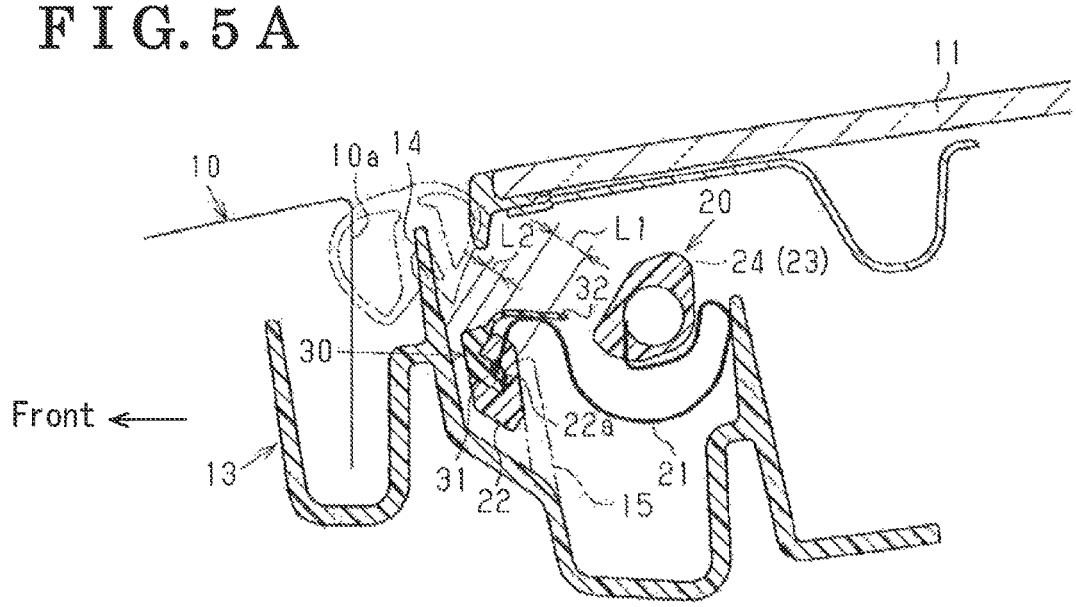
FIG. 5A is a longitudinal cross-sectional view illustrating a retracted state of the deflector apparatus of FIG. 2.
Figure 5B:
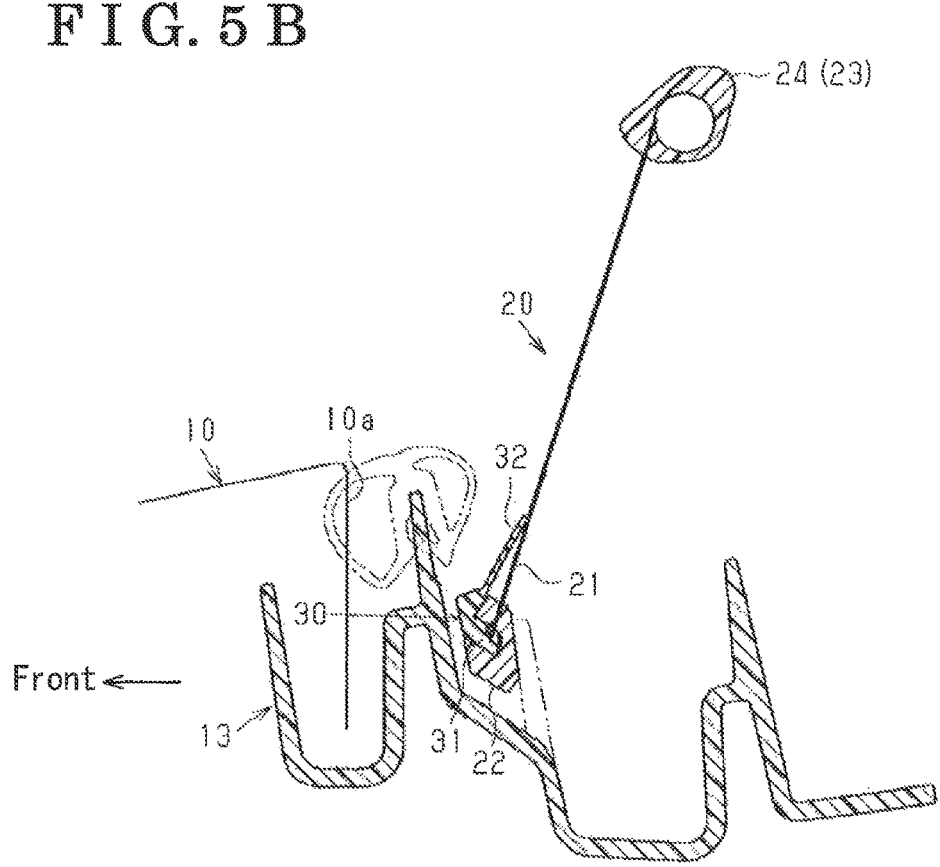
FIG. 5B is a longitudinal cross-sectional view illustrating an expanded state of the deflector apparatus of FIG. 2.
Figure 6:
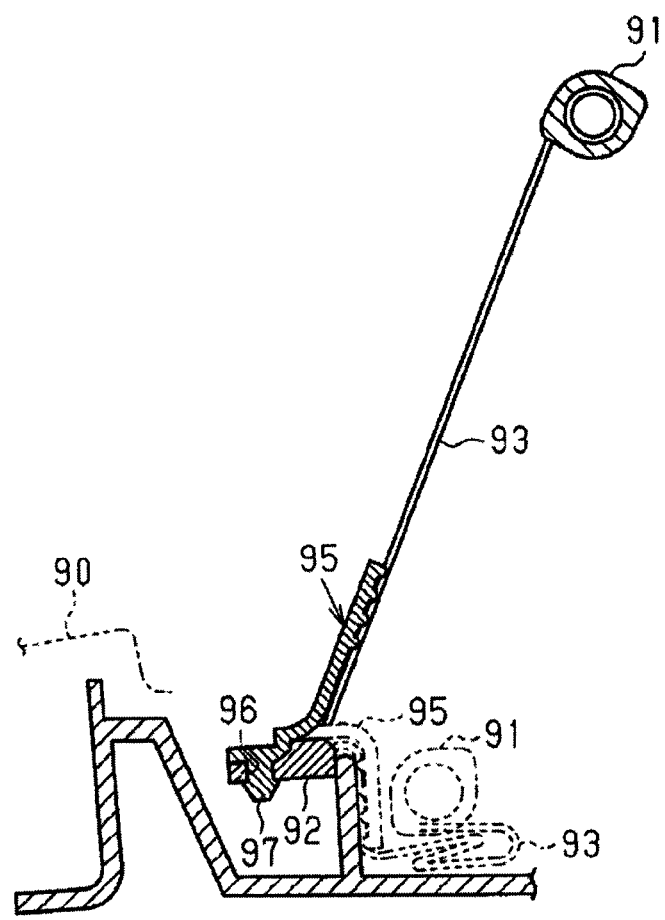
FIG. 6 is a longitudinal cross-sectional view illustrating a known deflector apparatus.

A pair of guide members 30 formed of, for example, extruded material of elastomer such as TPO (olefinic elastomer), for example, is attached to the lower frame 22 to extend in the width direction. The guide members 30, which are provided as the pair, are arranged at respective sides relative to a width-direction central portion of the mesh member 21 in a manner that a distance is provided between the guide members 30. As illustrated in FIGS. 5A and 5B, the guide member 30 includes a fitting protrusion 31 and a guide piece 32 formed in a substantially band-shape. The fitting protrusion 31 is extended obliquely towards a rear lower direction and the guide piece 32 is extended from an upper end of the fitting protrusion 31, the upper end portion which is positioned at a front relative to the mesh member 21. The lower frame 22 is provided with a fitting recess 22a including a length which corresponds to at least the entire length of each of the guide members 30 in a long-side direction of the guide member 30. The fitting recess 22a is extended obliquely from a front end surface of the lower frame 22 towards a rear lower direction. The guide member 30 is connected to the lower frame 22 in a manner that the fitting protrusion 31 is inserted in the fitting recess 22a and is fitted therein.

The front housing 13 includes a restriction wall 14 that is extended in the width direction and is formed at a position which is at a front side relative to the lower frame 22 and is adjacent to the lower frame 22. The restriction wall 14 is extended upwardly from the front housing 13. The lower frame 22 engages with the restriction wall 14 at, for example, a central portion in the width direction at which the fitting recess 22a is not formed, and thus the lower frame 22 is positioned and fixed relative to the front housing 13. An engagement structure of the restriction wall 14 and the lower frame 22 is not shown. The restriction wall 14 restricts the guide members 30 from moving in a counter-insertion direction of the fitting protrusions 31. Specifically, the restriction wall 14 restricts in such a manner that a movable distance L2 of the guide member 30 in the counter-insertion direction of the fitting protrusion 31 corresponds to a distance that is shorter than an insertion amount L1 of the fitting protrusion 31 relative to the fitting recess 22a. Accordingly, the guide members 30 are restricted from falling off the lower frame 22.

The front housing 13 is provided with a rear restriction wall portion 15 formed in a substantially tab shape and arranged at a predetermined position in the width direction. The rear restriction wall portion 15 is extended upwardly from the front housing 13 at a position which is at a rear side relative to the lower frame 22 and is adjacent to the lower frame 22. A rear end surface of the lower frame 22 is in contact with the rear restriction wall portion 15, and accordingly the lower frame 22 is restricted from being displaced rearward.

Next, an operation of the present embodiment will be described. First, as illustrated in FIG. 5A, in a case where the deflector 20 is in the retracted state, the guide piece 32 of the guide member 30 is released from an external force and is in a state of being elastically recovered (no load state), and the guide piece 32 is extended substantially rearward. The mesh member 21 positioned below the frame portion 24 is folded at a rear side relative to the lower frame 22, and the guide piece 32 is positioned above the mesh member 21.

When the upper frame 23 rotates upwardly about the shaft portion 26 so that the deflector 20 changes from the retracted state illustrated in FIG. 5A to the expanded state illustrated in FIG. 5B, the mesh member 21 of which the end portions are fixed to the lower frame 22 and the upper frame 23 (the frame portion 24) is extended or elongated in the short-side direction of the mesh member 21, and is expanded to protrude above a surface of the roof 10. The guide piece 32 that is positioned above the mesh member 21 in the retracted state is elastically deformed by a tensile force of the mesh member 21 so as to be folded and bent towards the upper side in the expanded state. Accordingly, the guide piece 32 does not inhibit the mesh member 21 from performing an expanding movement. A distal end (an upper end) of the guide piece 32 is positioned below the upper surface of the roof 10, that is, a design surface of the vehicle, and thus the distal end of the guide piece 32 is restricted from being exposed outside the vehicle.

When the upper frame 23 rotates downwardly about the shaft portion 26 so that the deflector 20 changes from the expanded state illustrated in FIG. 5B to the retracted state illustrated in FIG. 5A, the mesh member 21 of which the end portions are fixed to the lower frame 22 and the upper frame 23 is folded down while being shortened in the short-side direction, and is retracted at the lower side relative to the upper surface of the roof 10. As the tensile force of the mesh member 21 decreases, the guide piece 32 elastically recovers to the original shape from the state of being elastically deformed. As the guide piece 32 becomes gradually inclined towards substantially rearward (that is, as the guide piece 32 returns to the shape in the no load state), the mesh member 21 is guided to be folded at the rear side relative to the lower frame 22. In the retracted state of the deflector 20, the mesh member 21 is in contact with or is in proximity to the guide piece 32 positioned above the mesh member 21, however, the mesh member 21 is in a state in which the mesh member 21 is not sandwiched by, for example, the rear restriction wall portion 15 and the guide piece 32, that is, the mesh member 21 is in a non-sandwiched state. That is, the guide member 30 elastically recovers so as to guide the mesh member 21 to be folded towards the rear side during the retracting movement of the mesh member 21, and the guide member 30 releases the mesh member 21 in the non-sandwiched state at completion of the retracting movement.

As described above in detail, the following effects are obtained according to the present embodiment. (1) In the present embodiment, the folding of the mesh member 21 towards the rear side is guided by the elastic recovery of the guide member 30, and accordingly the retracting movement of the mesh member 21 (the deflector 20) can be more stabilized. For example, even in a case where the mesh member 21 is influenced by wind or a load from the rear side during the retracting movement of the mesh member 21 (the deflector 20), the mesh member 21 can be restricted from being caught in, for example, the movable panel 11 or from being folded towards the front side. Because the mesh member 21 is released from the guide member 30 in the non-sandwiched state at completion of the retracting movement of the mesh member 21 (the deflector 20), wrinkles are not generated easily at the mesh member 21.

(2) In the present embodiment, the guide member 30 is attached to the lower frame 22 in a manner that the fitting protrusion 31 is inserted in the fitting recess 22a and is fitted therein. The guide member 30 is restricted from moving by the restriction wall 14 such that the movable distance L2 of the guide member 30 in the counter-insertion direction of the fitting protrusion 31 is the distance L2 that is smaller than the insertion amount L1. Consequently, the guide member 30 can be restricted from falling off the lower frame 22.

The restriction wall 14 is provided at the existing front housing 13, and accordingly the number of parts and components can be restricted from increasing. (3) In the present embodiment, the guide members 30 are arranged as the pair at both the sides of the central portion of the mesh member 21 in the width direction. Accordingly, in comparison with a case in which, for example, one guide member 30 is arranged to extend along a substantially entire length of the mesh member 21 in the width direction, each of the guide members 30 can be restricted from becoming long and large. Also, the folding of the mesh member 21 towards the rear side can be guided substantially equally by both of the guide members 30.

At the lower frame 22, the guide member 30 is not provided at a position corresponding to the width-direction central portion of the mesh member 21. Accordingly, the lower frame 22 can be fixed to the front housing 13 (the restriction wall 14) at the position corresponding to the above-described width-direction central portion.

(4) In the present embodiment, both the guide members 30 exist in a large area in the width direction of the mesh member 21. Accordingly, for example, even in a case where the mesh member 21 is influenced by the wind or the load from the rear side during the retracting movement, the mesh member 21 can be folded in the rear direction over a substantially entire length in the width direction of the mesh member 21.

(5) In the present embodiment, the guide member 30 can be attached to the lower frame 22 without the use of a fastener including a screw, for example. Accordingly, the number of the parts and components, and the number of manufacturing process can be reduced.

(6) In the present embodiment, in the expanded state of the mesh member 21 (the deflector 20), the guide member 30 (the guide piece 32) is positioned at the lower side relative to the upper surface of the roof 10. Therefore, the design surface can be restricted from deteriorating, and wind noise or wind throb can be restricted from worsening.

The aforementioned embodiment may be modified as follows. In the aforementioned embodiment, the guide piece 32 of the guide member 30 may be curved to include an upward protrusion in the state in which the guide piece 32 is released from the external force (the no load state), in a similar manner to the mesh member 21 folded towards the rear side.

In the aforementioned embodiment, in the expanded state of the mesh member 21 (the deflector 20), the guide member 30 (the guide piece 32) may be positioned above the upper surface of the roof 10. In the aforementioned embodiment, three or more guide members may be provided with a distance provided between the guide members in the width direction. Alternatively, one guide member may be provided. It is ideal that the one guide member or the plural guide members are arranged left/right symmetrically so that the folding of the mesh member 21 can be guided evenly.

In the aforementioned embodiment, the fitting recess 22a of the lower frame 22 and the fitting protrusion 31 of the guide member 30 may be omitted. For example, the lower frame 22 and the guide member 30 may be joined to each other in such a manner that a tab protrudingly provided at the guide member 30 is engaged in an engagement hole formed at the lower frame 22. The lower frame 22 and the guide member 30 may be joined to each other with an appropriate fastener (a bolt, a nut, for example).

In the aforementioned embodiment, the guide member may keep holding the mesh member 21 in the sandwiched state at completion of the retracting movement. In the aforementioned embodiment, the lower frame 22 may be held by an appropriate bracket fixed to the roof 10.

In the aforementioned embodiment, at least one of the upper frame 23 and the lower frame 22, and the end portion of the mesh member 21 may be connected to each other with an appropriate connector. In the aforementioned embodiment, the facing made of cloth which includes no hole threat (including non-woven cloth) may be used instead of the mesh member 21.

In the aforementioned embodiment, both the arm portions 25 of the upper frame 23 may be omitted. In this case, for example, the lower frame 22 and the frame portion 24 (the upper frame) may be connected to each other with an appropriate biasing member (for example, a helical compression spring). By making the biasing member to expand and contract together with the mesh member 21, the mesh member 21 (the deflector 20) may be expanded and retracted.

The invention claimed is:

1. A deflector apparatus for a vehicle, comprising:
 a lower frame fixed to a roof of a vehicle to be extended in a vehicle width direction along a front edge portion of an opening formed at the roof, the lower frame including a fitting recess;
 an upper frame extended in the vehicle width direction along the front edge portion of the opening;
 a facing extended along the front edge portion of the opening and including both end portions in a short-side direction, both the end portions being held by the lower frame and the upper frame, respectively, the facing being configured to protrude above a surface of the roof in association with an upward movement of the upper frame relative to the lower frame, the facing being configured to be folded and retracted towards a rear side of the vehicle in association with a downward movement of the upper frame relative to the lower frame;
 a guide member including a fitting protrusion fitted in the fitting recess along an insertion direction, the guide member elastically recovering to guide the facing to be folded towards the rear side of the vehicle at a retracting movement of the facing; and
 a restriction wall restricting the guide member from moving in a counter-insertion direction of the fitting protrusion such that a movable distance of the guide member in the counter-insertion direction is a distance that is shorter than an insertion amount of the fitting protrusion relative to the fitting recess.

2. The deflector apparatus for the vehicle according to claim 1, wherein at completion of the retracting movement, the guide member releases the facing in a non-sandwiched state.

3. The deflector apparatus for the vehicle according to claim 1, wherein the guide member is provided at each of both sides of the facing relative to a central portion of the facing in the vehicle width direction as a pair.

4. The deflector apparatus for the vehicle according to claim 1, wherein the guide member is positioned at a lower side relative to the surface of the roof in an expanded state in which the facing protrudes above the surface of the roof.

* * * * *